Feb. 15, 1949.  E. NASSIMBENE  2,461,654
HIGH SPEED BELT
Filed July 31, 1944

INVENTOR.
ERNEST NASSIMBENE
BY
Martin E. Anderson
Attorney

Patented Feb. 15, 1949

2,461,654

UNITED STATES PATENT OFFICE 2,461,654

HIGH-SPEED BELT

Ernest Nassimbene, Denver, Colo., assignor to Gates Rubber Company, Denver, Colo., a corporation of Colorado Application July 31, 1944, Serial No. 547,414

1 Claim. (Cl. 74—232)

This invention relates to improvements in high speed belts and has reference more particularly to a flat belt designed for service where power is transmitted at very high speeds, as, for example, in grinding machines used for making bearings.

Belts for use in high speed power transmission systems should be made as flexible as practicable so as to reduce the generation of heat and the strains incident to the continuous flexing, to a minimum.

It is the object of this invention to produce a belt composed principally of strong tension cords or wires wound helically in one or more layers and held together by means of a suitable agglutinant which, in addition to adhesively connecting the adjacent cords, also serves as a binder of great tensile strength for the successful resistance of transversely acting forces that tend to separate the tension members.

This invention, briefly described, comprises a belt formed from one or more layers of continuous helically wound tension members of suitable material such as fiber, or wire, with their ends anchored so as to prevent unraveling. This tension layer is then enclosed in a covering of rubber-like material or a suitable plastic in which fine fiber linters of cotton, "rayon," nylon or other suitable material has been incorporated. The agglutinant with its reenforcing linters is applied to the tension members under pressure so as to force it into the interstices between the adjacent tension members and into closed contact with their outer surfaces after which the belt is vulcanized or otherwise cured in a suitable mould.

Having thus briefly described the invention and its objects, it will now be described in greater detail and for this purpose reference will be had to the accompanying drawing in which the invention has been illustrated in its preferred form, and in which.

Figure 5:
Figure 5 is a view showing how the ends of the spiral wound cords are anchored.

In the drawing reference numeral 10 designates the tension members that form the transmitting body or tension layer of the belt. These members are wound spirally, each layer comprising a continuous cord or wire. Where only one layer is employed, the ends of the tension members are anchored so as to prevent unraveling, in a manner somewhat like that shown in Figure 5. Where two or more layers are employed, the tension members may be continuous for all of the layers or a separate length may be employed for each layer as may be found to be most desirable.

In the drawing and in the description the belt will be considered as having a single layer of tension members, it being understood, however, that two or more layers can be used, if desired.

The belt is provided either on one or both sides with a covering 11, which is formed from some vulcanizable rubber-like material, a plastic or other suitable agglutinant. The material may be either natural rubber; one of the synthetics now in use which have rubber-like properties, or a suitable plastic. The covering has incorporated therein linters which have been designated in the drawing by reference numeral 12.

Figure 1:
Figure 1 is a view showing a belt encircling two spaced pulleys, illustrating a typical power transmission arrangement.
Figure 2:
Figure 2 is an edge view of the belt to substantially twice its actual scale, certain parts having been broken away to better disclose the construction.
Figure 6:
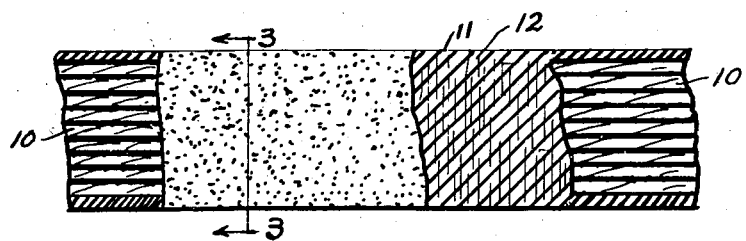
Figure 6 is a top plan view of a section of the belt with a portion of the covering shown in section and other portions shown broken away to disclose the tension members.

It is preferable to so construct the belt that the fibers are parallel and extend transversely as shown in Figure 6. When the linter fibers are all arranged parallel and at right angles to the tension members, they add nothing to the tensile strength of the belt, but serve to reenforce it against forces tending to separate the tension members. By incorporating the linters in the covering so that the fibers extend in all directions, the covering will resist both transverse and longitudinal forces tending to crack it as well as forces tending to separate the tension members.

Figure 3:
Figure 3 is a transverse section taken on line 3—3, Figure 6, and shows the cords positioned substantially at the middle of an enclosing covering.

In Figure 3 a cross section has been shown in which the tension layer is positioned in the middle of the covering so that the belt is symmetrical with respect to the transverse plane containing the layer. Such a belt can be employed with either side on the inside due to its symmetrical construction.

Figure 4:
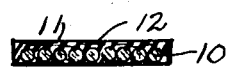
Figure 4 is a section similar to that shown in Figure 3, but shows the covering limited to one side of the tension layer.

In Figure 4 a construction has been shown in which the covering is positioned almost entirely on one side of the tension layer. This form of construction has certain advantages in high speed belts and may be desirable for some forms of power transmission. A belt made in accordance with the showing in Figure 4 is also reversible and for some purposes it is found that certain advantages accrue from so running the belt that the tension layer in on the outside, one such advantage being that it increases the gripping power of the belt and the coefficient of friction.

Particular attention is called to the fact that the covering material 11 is applied in such a way that it is forced in between the several tension members so as to entirely enclose them. The tension members are spaced so as to permit this penetration.

Particular attention is called to the fact that the belt forming the subject of this invention is a thin flat belt and is employed in such a way that there are normally no transverse compressive strains. The construction of the belt is not designed to resist transverse compressive strains. Flat belts are subjected to outwardly acting transverse strains which tend to separate the tension members and for this reason the fibers have been distributed so as to extend transversely only, or in all directions as above explained.

In the belt as above described, the tension members are usually formed from cotton staple and prestretched so as to be practically inextensible. It is to be understood, however, that instead of cotton, any other suitable fibers or metal wires may be employed, including such artificial fibers as may be found suitable. The linters that are mixed with the covering are preferably cotton linters, but these may, however, be replaced by similar fibers of any other material, such as wool, asbestos or artificial fibers of the type manufactured sold under the name of "rayon," "celanese," "nylon," etc.

From the above description it will be apparent that a belt constructed in the manner shown on the drawing and described herein is extremely flexible, that the tension elements are well protected against the action of deleterious vapors and are securely held in assembled relation and in an elastic manner by the covering 11 with its intermixed fibers or linters.

Although the tension members 10 are preferably made from some fibrous material either cotton, wool or artificial fibers it is to be understood that metal wires may be used, if desired. The words "cord" and "tension members" are therefore intended to be broad enough to include mechanical equivalents.

Having described the invention what is claimed as new is:

A highly flexible thin flat belt consisting of a single layer of helically wound, spaced tension members, and a thin agglutinant covering of vulcanizable rubber-like material for at least one side of the tension layer, the covering having portions thereof extending into the spaces between the tension members to provide an elastic spacer and attaching means, the covering material having incorporated therein linter fibers extending transversely of the belt in planes parallel with the tension layer, the linters providing means for resisting forces tending to split the belt longitudinally.

ERNEST NASSIMBENE.

REFERENCES CITED

The following references are of record in the file of this patent:

UNITED STATES PATENTS

| Number | Name | Date |
|---|---|---|
| 556,663 | Dennison | Mar. 17, 1896 |
| 1,277,711 | Gammeter | Sept. 3, 1918 |
| 1,403,859 | Grupe | Jan. 17, 1922 |
| 2,064,781 | Collins | Dec. 15, 1936 |
| 2,114,517 | Apel et al. | Apr. 19, 1938 |
| 2,135,057 | Slayter et al. | Nov. 1, 1938 |
| 2,167,384 | Freedlander | July 25, 1939 |
| 2,210,073 | Freedlander | Aug. 6, 1940 |
| 2,211,202 | Freedlander | Aug. 13, 1940 |
| 2,256,756 | Brown | Sept. 23, 1941 |
| 2,292,290 | Robins | Aug. 4, 1942 |
| 2,356,249 | Kremer et al. | Aug. 22, 1944 |